United States Patent
Devaraj et al.

(10) Patent No.: US 11,499,533 B2
(45) Date of Patent: Nov. 15, 2022

(54) ROTOR FOR A WIND TURBINE AND WIND TURBINE

(71) Applicant: Siemens Gamesa Renewable Energy A/S, Brande (DK)

(72) Inventors: Aravind Devaraj, Kerala (IN); Sajeesh Sulaiman, Karnataka (IN)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 42 days.

(21) Appl. No.: 16/877,672

(22) Filed: May 19, 2020

(65) Prior Publication Data

US 2020/0378358 A1 Dec. 3, 2020

(30) Foreign Application Priority Data

May 27, 2019 (EP) .................... 19176665

(51) Int. Cl.
| | |
|---|---|
| *F03D 80/30* | (2016.01) |
| *F03D 80/70* | (2016.01) |
| *F03D 1/06* | (2006.01) |
| *F03D 7/02* | (2006.01) |
| *H02G 13/00* | (2006.01) |
| *H02G 1/04* | (2006.01) |

(52) U.S. Cl.
CPC ........... *F03D 80/30* (2016.05); *F03D 1/0658* (2013.01); *F03D 7/0224* (2013.01); *F03D 80/70* (2016.05); *H02G 13/80* (2013.01); *Y02E 10/72* (2013.01)

(58) Field of Classification Search
CPC ...... F03D 80/30; F03D 7/0224; F03D 1/0658; H02G 13/80; H02H 1/04
See application file for complete search history.

(56) References Cited

U.S. PATENT DOCUMENTS

2018/0097347 A1* 4/2018 March Nomen ...... H02G 13/40

FOREIGN PATENT DOCUMENTS

| EP | 0718495 A1 | 6/1996 |
|---|---|---|
| EP | 2708743 A1 | 3/2014 |
| KR | 20120039139 A | 4/2012 |

OTHER PUBLICATIONS

European Search Report and Written Opinion of the European Searching Authority dated Nov. 27, 2019 for Application No. 19176665.8.

* cited by examiner

*Primary Examiner* — Courtney D Heinle
*Assistant Examiner* — Michael K. Reitz
(74) *Attorney, Agent, or Firm* — Schmeiser, Olsen & Watts LLP

(57) ABSTRACT

Provided is a rotor for a wind turbine, including: a blade, a hub, a pitch bearing being configured to support the blade rotatably about a longitudinal axis of the blade and relative to the hub, and one or more metal arcs for conducting a lightning current from the blade to the hub, the one or more metal arcs including: a first arc portion electrically and mechanically connected to the blade, a second arc portion electrically and mechanically connected to the hub, and a bent portion connecting the first and second arc portions. The metal arcs being configured such that, when the blade rotates relative to the hub, the first arc portion is shifted relative to the second arc portion and a length of the first arc portion is reduced or increased at the expense of an increase or decrease of a length of the second arc portion.

14 Claims, 7 Drawing Sheets

ROTOR FOR A WIND TURBINE AND WIND TURBINE

CROSS-REFERENCE TO RELATED APPLICATIONS

This application claims priority to European Application No. 19176665.8, having a filing date of May 27, 2019, the entire contents of which are hereby incorporated by reference.

FIELD OF TECHNOLOGY

The following relates to a rotor for a wind turbine and the wind turbine.

BACKGROUND

Lightning protection is one of the biggest challenges in wind turbine design. Wind turbines are usually the tallest structures in a local environment, especially in offshore wind parks. Therefore, the probability of being hit by lightning is very high. Lightning strikes predominantly the tallest point of the wind turbine which is usually the blade.

Lightning currents need to be transferred between various rotating parts of the wind turbine. For example, the lightning current that flows through the blade needs to be transmitted to the ground via the hub, the nacelle and the tower. Usually, the blade is rotatably connected to the hub, the hub is rotatably connected to the nacelle and the nacelle is rotatably connected to the tower. Due to the parts rotating relative to each other, cables for conducting a lightning current are in most cases unsuitable. The pitch bearing at the connection of the blade to the hub is one of the critical parts where an improved lightning protection system is required.

Conventionally, for example, carbon brushes are used to conduct lightning current bypassing the bearing. However, the brushes are sliding parts which get worn out quickly. Thus, they need to be replaced frequently which is time and cost consuming. Alternatively, spark gaps are applied. However, they have the disadvantage that the blades tend to accumulate static electricity. This causes the risk of flashovers if sufficient grounding is not provided. Alternatively, the lightning current is passed from the blade down conductor through a high-voltage cable through an opening at the center of the inner ring of the pitch bearing. However, lightning current passing through the high-voltage cable generates huge magnetic fields inside the hub. This can damage the electronic components inside the hub. A further conventional approach is to directly pass a lightning current through the bearing. However, this causes a high risk of damaging the bearing. Replacing a bearing after starting operation of the wind turbine is a very expensive and time-consuming process.

SUMMARY

An aspect relates to an improved rotor for a wind turbine and an improved wind turbine.

Accordingly, a rotor for a wind turbine is provided. The rotor comprises a blade and a hub. The rotor further comprises a pitch bearing configured to support the blade rotatably about a longitudinal axis of the blade and relative to the hub. Furthermore, the rotor comprises one or more metal arcs for conducting a lightning current from the blade to the hub. Each of the one or more metal arcs comprises a first arc portion electrically and mechanically connected to the blade. Each of the one or more metal arcs comprises a second arc portion electrically and mechanically connected to the hub. Further, each of the one or more metal arcs comprises a bent portion connecting the first and second arc portions. Each of the one or more metal arcs is configured such that, when the blade rotates relative to the hub, the first arc portion is shifted relative to the second arc portion and a length of the first arc portion is reduced or increased at the expense of an increase or decrease of a length of the second arc portion.

This allows to conduct a lightning current from the blade to the hub bypassing the pitch bearing and still allows rotation of the blade relative to the hub. In particular, the metal arcs provide a low impedance path for the lightning current. Thus, damaging of the pitch bearing by a lightning current is avoided.

Furthermore, having the one or more metal arcs avoids sliding parts as in carbon brushes. Thus, the lifetime of the metal arcs is much larger than that of carbon brushes.

In addition, high magnetic fields inside of the hub due to a lightning current are prevented.

The wind turbine is an apparatus to convert the wind's kinetic energy into electrical energy. The wind turbine comprises, for example, the rotor having one or more of the blades and one or more of the pitch bearings. Each of the blades is connected rotatably to the hub by means of one of the pitch bearings. The hub is connected to a nacelle including a generator. The wind turbine further comprises a tower holding, at its top end, the nacelle. The tower of the wind turbine may be connected via a transition piece to a foundation of the wind turbine, such as a monopile in the seabed.

The one or more metal arcs are, in particular, made from a flexible metal. The one or more metal arcs are, for example, made from spring steel.

The rotor comprises, for example, one metal arc covering 360 degrees, two semicircular metal arcs covering each 180 degrees, three metal arcs covering each 120 degrees or four metal arcs covering each 90 degrees.

The metal arcs are, in particular, arranged along a circumference of the blade. The circumference of the blade is, for example, an outer circumference of the blade.

The second arc portion is, for example, arranged parallel to the first arc portion. Then, when the blade rotates relative to the hub, the first arc portion of each of the one or more metal arcs is shifted relative to the second arc portion such that the first and second arc portions remain parallel to each other.

According to an embodiment, each of the one or more metal arcs is configured such that in an initial rotation state of the blade relative to the hub, the length of the first arc portion is equal to the length of the second arc portion, and in a rotation state of the blade relative to the hub offset from the initial rotation state, the length of the first arc portion is different from the length of the second arc portion.

Having the first and second arc portions of the one or more metal arcs of equal length in the initial rotation state of the blade provides a symmetric and robust configuration of the metal arcs and their electrically and mechanically connection with the blade and the hub.

The initial rotation state of the blade relative to the hub corresponds, in particular, to a blade pitch angle of zero.

According to a further embodiment, the first arc portion of each of the one or more metal arcs comprises a main portion connected to the bent portion, the bent portion and the main portion being freely movable with respect to the blade. Further, the first arc portion of each of the one or more metal arcs comprises an end portion connected to the main portion, the end portion being fixedly connected to the blade. Further, both the main and end portions are electrically connected to the blade. Furthermore, the second arc portion of each of the one or more metal arcs comprises a main portion connected to the bent portion, the bent portion and the main portion being freely movable with respect to the hub. Further, the second arc portion of each of the one or more metal arcs comprises an end portion connected to the main portion, the end portion being fixedly connected to the hub, and both the main and end portions being electrically connected to the hub.

Having the main portions being freely removable and the end portions being fixedly connected allows to securely fix the one or more metal arcs to the blade and the hub and at the same time allow rotation of the blade relative to the hub over a large angular range.

In embodiments, for each of the first and second arc portions of each of the one or more metal arcs, the main portion is larger than the end portion in the initial rotation state of the blade relative to the hub. In particular, for each of the first and second arc portions of each of the one or more metal arcs, the main portion covers a larger arc segment of the metal arc compared to the end portion. For example, the length of the main portion along the arc comprises more than 70%, more than 80%, more than 90%, more than 95% of the first/second arc portion in the initial rotation state.

According to a further embodiment, the blade comprises a blade root section and the first arc portion of each of the one or more metal arcs is electrically and mechanically connected to the blade root section.

According to a further embodiment, the one or more metal arcs are arranged along an outer circumference of the blade.

Having the one or more metal arcs arranged along an outer circumference of the blade allows to better prevent high magnetic fields inside the hub due to lightning current passing through the metal arcs.

In particular, the one or more metal arcs are arranged along an outer circumference of the cylindrical blade root section.

According to a further embodiment, the blade comprises in its hollow interior an interior conductive ring for connection with one or more down conductors of the blade. The interior conductive ring is electrically connected with the first arc portion of each of the one or more metal arcs.

Having the interior conductive ring allows to distribute a lightning current from the blade, e.g., from the blade down conductor, evenly to the one or more first arc portions of the one or more metal arcs.

The interior conductive ring is, in particular, connected to an interior wall of a blade shell forming an inner cavity of the blade. The interior conductive ring is, in particular, connected to the interior wall along its entire circumference. The interior conductive ring is, in particular, made from metal.

The one or more down conductors may, for example, be split and connected to the interior conductive ring at various positions thereof.

According to a further embodiment, the interior conductive ring of the blade is electrically connected with the first arc portion of each of the one or more metal arcs by means of conductive elements extending from the blade interior to the blade exterior.

Having the conductive elements of the blade, allows to electrically connect the interior conductive ring with the first arc portion of the one or more metal arcs in the case that the one or more metal arcs are arranged along the outer circumference of the blade.

The conductive elements are, in particular, extending through the shell of the blade. The conductive elements are, in particular, made from metal.

According to a further embodiment, the pitch bearing comprises an inner ring mounted to the blade and an outer ring mounted to the hub. Further, the conductive elements of the blade are conductive bushings configured for mounting the blade to the inner ring of the pitch bearing by means of fasteners.

By using the conductive bushings configured for mounting the blade to the pitch bearing which are available anyway, no additional conductive elements are required for connecting the interior conductive ring of the blade with the one or more metal arcs.

The conductive bushings are, for example, threaded bushings. The fasteners are, for example, bolts.

In embodiments, the inner ring of the pitch bearing may be mounted to the hub and the outer ring of the pitch bearing may be mounted to the blade.

According to a further embodiment, the pitch bearing comprises an inner ring mounted to the blade and an outer ring mounted to the hub. Further, the conductive elements of the blade are arranged spaced apart and electrically isolated from conductive bushings of the blade being configured for mounting the blade to the inner ring of the pitch bearing by means of fasteners.

By using conductive elements of the blade which are arranged spaced apart and electrically isolated from the conductive bushings of the blade being configured for mounting the blade to the pitch bearing, it can be better avoided that lightning current is transmitted via the conductive bushings and the fasteners to the pitch bearing. Thus, it is better ensured that the lightning current is transferred completely by the one or more metal arcs and no current flows through the pitch bearing.

According to a further embodiment, the second arc portion of each of the one or more metal arcs is electrically and mechanically connected to an outer ring of the pitch bearing. In addition, the outer ring of the pitch bearing is electrically and mechanically connected to the hub.

According to a further embodiment, the hub comprises an outer circumferential protruding portion protruding in the direction of the blade. Furthermore, the second arc portion of each of the one or more metal arcs is electrically and mechanically connected to the protruding portion of the hub.

The protruding portion may protrude solely in the longitudinal direction of the blade. Alternatively, the protruding portion may comprise in addition to the portion protruding in the longitudinal direction of the blade also a portion protruding in a radial direction of the blade. Thus, the protruding portion has an angled configuration. The radial protruding portion may be configured for being connected to the second arc portion in the case that the first and second arc portions of each of the one or more metal arcs are arranged parallel to each other in a longitudinal direction of the blade.

According to a further embodiment, the one or more metal arcs are arranged outboard with respect to the pitch bearing.

Having the one or more metal arcs arranged outboard with respect to the pitch bearing allows to even better transmit lightning current from the blade to the hub bypassing the pitch bearing.

In embodiments, the one or more metal arcs may also be arranged inboard with respect to the pitch bearing. This may be in particular the case when the first and second arc portions of each of the one or more metal arcs are arranged parallel to each other in a radial direction of the blade.

According to a further embodiment, the first and second arc portions of each of the one or more metal arcs are arranged parallel to each other in a radial direction of the blade.

Having this parallel configuration of the first and second arc portions in the radial direction of the blade allows a direct transmission of the rotational force of the blade to the one or more metal arcs.

In particular, the first and second arc portions are arranged parallel to each other in a radial direction of the blade root section.

According to a further embodiment, the first and second arc portions of each of the one or more metal arcs are arranged parallel to each other in a longitudinal direction of the blade.

Having this parallel configuration of the first and second arc portions in the longitudinal direction of the blade provides a further design option for the rotor of the wind turbine blade.

According to a further aspect, a wind turbine is provided. The wind turbine comprises a rotor as described above.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with references to the following Figures, wherein like designations denote like members, wherein.

DETAILED DESCRIPTION

Figure 1:
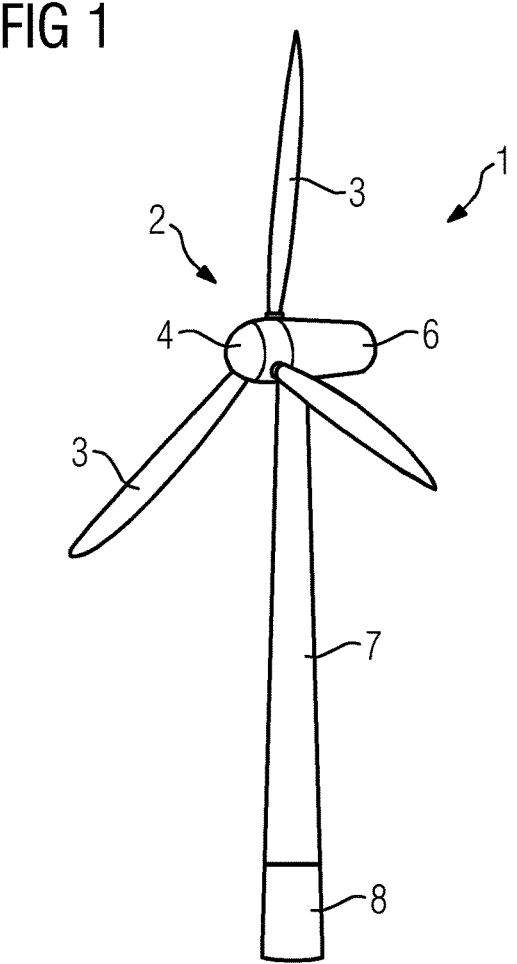
FIG. 1 shows a wind turbine according to an embodiment.

FIG. 1 shows a wind turbine 1 according to an embodiment. The wind turbine 1 comprises a rotor 2 having one or more blades 3 connected to a hub 4 by means of a pitch bearing 5 (not shown in FIG. 1). The rotor 2 is connected to a generator (not shown) arranged inside a nacelle 6. During operation of the wind turbine 1, the blades 3 are driven by wind to rotate and the wind's kinetic energy is converted into electrical energy by the generator in the nacelle 6. The nacelle 6 is arranged at the upper end of a tower 7 of the wind turbine 1. The tower 7 is erected on a foundation 8 such as a monopile or tripile. The foundation 8 is connected to and/or driven into the ground or seabed.

Figure 2:
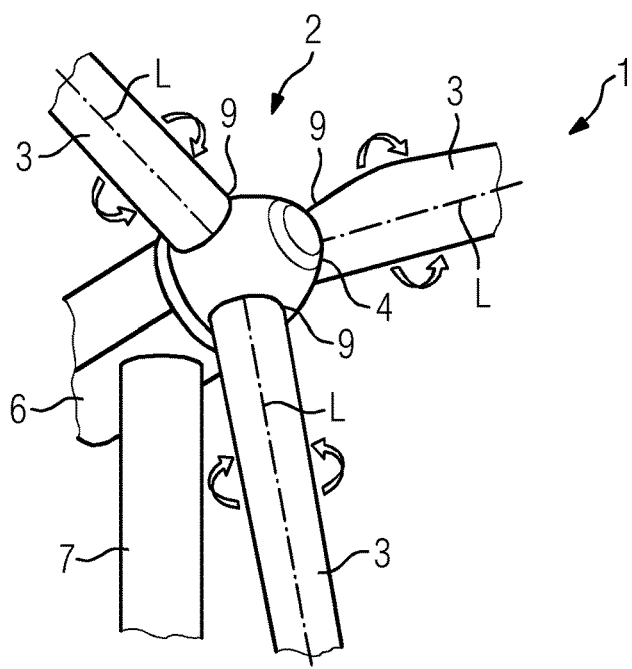
FIG. 2 shows a detailed view of a rotor with three blades and a hub of the wind turbine of FIG. 1.

FIG. 2 shows a detailed view of the rotor 2 of the wind turbine 1 of FIG. 1. The rotor 2 comprises three blades 3. Each of the blades 3 is connected rotatably at a cylindrical root section 9 thereof to the hub 4 by means of a pitch bearing 5. For example, each of the blades 3 is connected to an inner ring 10 (FIG. 3) of the pitch bearing 5. Further, an outer ring 11 of the pitch bearing 5 is connected to the hub 4. Each of the pitch bearings 5 is configured to support the respective blade 3 rotatably about a longitudinal axis L (FIG. 2) of the blade 3. By rotating the blade 3 relative to the hub 4, the angle of attack of the respective blade 3 according to the wind speed can be adjusted to control the rotational speed of the blade 3.

Figure 3:
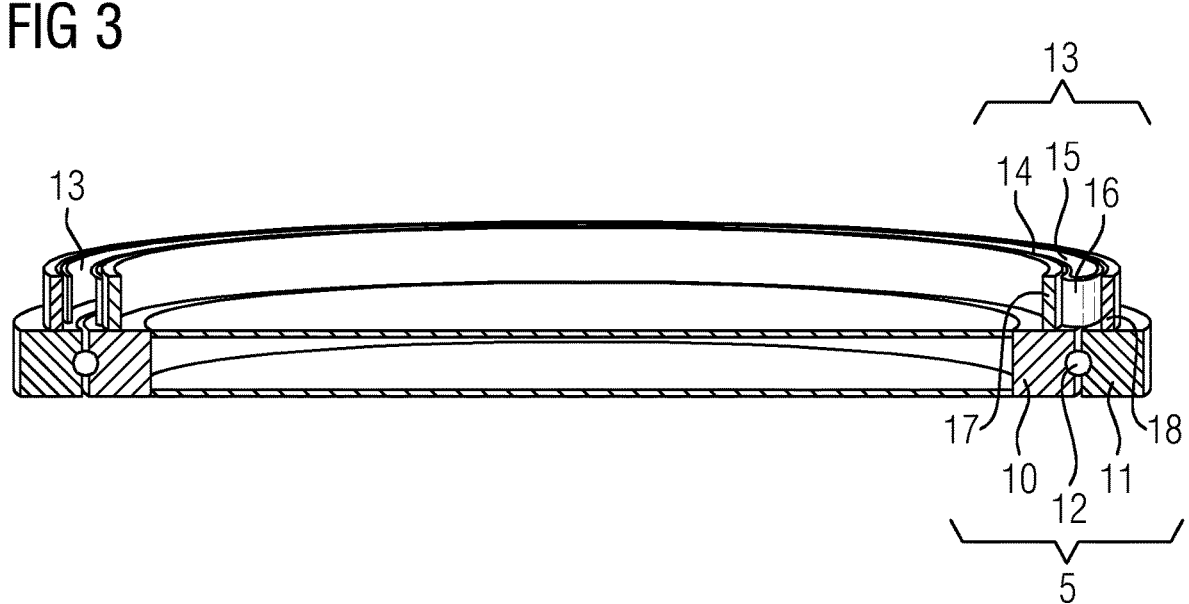
FIG. 3 shows a pitch bearing and metal arcs of the rotor of FIG. 2 illustrating a principle of an embodiment of the invention.

As schematically shown in FIG. 3, each of the pitch bearings 5 comprises roller elements 12 to allow a rotation of the inner ring 10, and thus of the blade 3, relative to the outer ring 11, and thus of the hub 4. Any suitable kind of pitch bearing can be used for the pitch bearing 5. In particular, any kind of suitable roller elements 12 can be applied. Further, the pitch bearing 5 may comprise several rows of roller elements 12.

Further shown in FIG. 3 are metal arcs 13 for conducting a lightning current from the blade 3 to the hub 4 bypassing the pitch bearing 5. Each of the metal arcs 13 comprises a first arc portion 14, a second arc portion 15, and a bent portion 16. The first arc portion 14 and the second arc portion 15 are parallel to each other. The first arc portion 14 is electrically and mechanically connected to an extending portion 17 of the inner ring 10 of the pitch bearing 5. The second arc portion 15 is electrically and mechanically connected to an extending portion 18 of the outer ring 11 of the pitch bearing 5.

Figure 4:
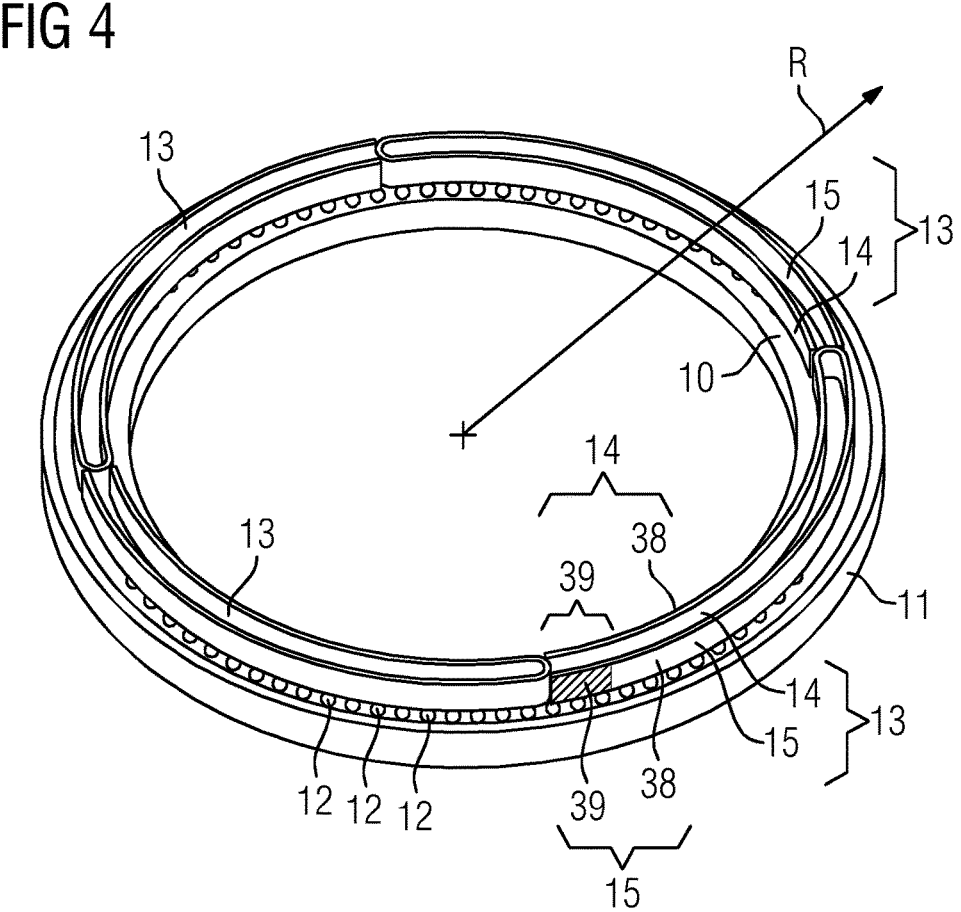
FIG. 4 shows a perspective partial view of the metal arcs and of the pitch bearing of FIG. 3.

FIG. 4 shows a perspective partial view of the metal arcs 13 and of the pitch bearing 5 of FIG. 3. For illustration purposes, the extending portions 17, 18 are not shown in FIG. 4. In this example, the rotor 3 comprises four metal arcs 13 each covering 90 degrees of a full circle. Further, in this example, the first and second arc portions 14, 15 of each of the metal arcs 13 are arranged parallel to each other in a radial direction R of the blade 3.

The metal arcs 13 are configured such that, when the blade 3 rotates relative to the hub 4 (i. e. the inner ring 10 of the pitch bearing 5 rotates relative to the outer ring 11), the first arc portion 14 is shifted relative to the second arc portion 15. In this manner, the metal arcs 13 allow rotation of the blade 3 relative to the hub 4, and at the same time an electrical connection between the blade 3 and the hub 4 is maintained in all rotation states by means of the metal arcs 13. This is in particular the case, as a pitch bearing in wind turbines is usually designed to rotate 90 degrees only. In comparison, other rotating parts in a wind turbine are usually designed to rotate 360 degrees.

As shown in FIG. 4, each of the first and second arc portions 14, 15 of each of the metal arcs 13 comprises a main portion 38 and an end portion 39. The main portion 38 of the first arc portion 14 is freely removable from the blade 3 (i.

e. from the inner ring 10) and the end portion 39 of the first arc portion 14 is mechanically and fixedly connected to the blade 3. Thereby, both the main and end portions 38, 39 are electrically connected to the blade 3. Likewise, the main portion 38 of the second arc portion 15 is freely removable from the hub 4 (i. e. from the outer ring 11) and the end portion 39 of the second arc portion 15 is mechanically and fixedly connected to the hub 4. Thereby, both the main and end portions 38, 39 of the second arc portion 15 are electrically connected to the hub 4. Thus, the metal arcs 13 are securely fix at their end portions 39 to the blade 3 and the hub 4, respectively. At the same time, the blade 3 can be rotated relative to the hub 4 by having the freely removable main portions 39.

Figure 5:
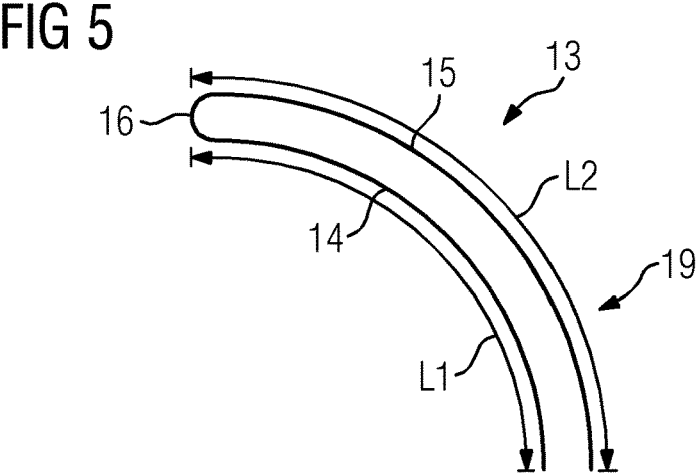
FIG. 5 shows a plan view of one of the metal arcs of FIG. 4 in an initial rotation state of the blade relative to the hub.
Figure 6:
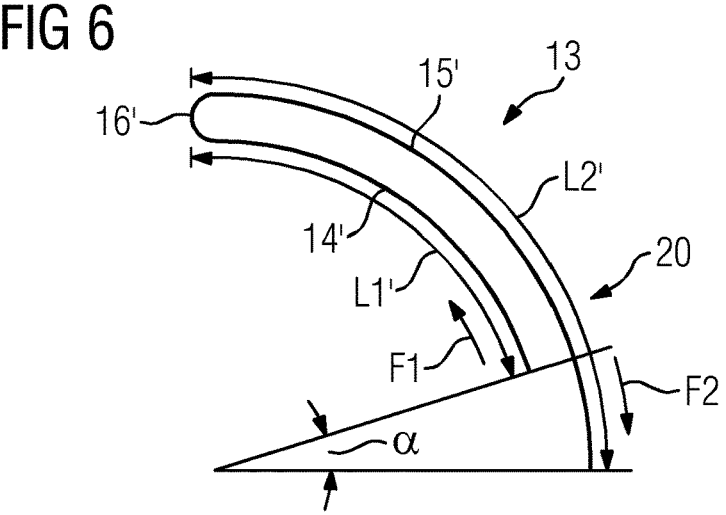
FIG. 6 shows the metal arc of FIG. 5 in a first rotation state of the blade relative to the hub offset from the initial rotation state.
Figure 7:
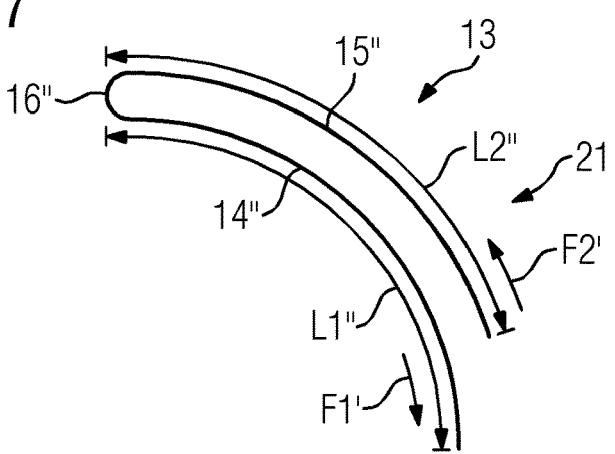
FIG. 7 shows the metal arc of FIG. 5 in a second rotation state of the blade relative to the hub offset from the initial rotation state.

FIGS. 5-7 illustrate the behavior of one of the metal arcs 13 during rotation of the blade 3 relative to the hub 4. The figures show a plan view of the metal arc 13 of FIG. 4. FIG. 5 shows the metal arc 13 in an initial rotation state 19 of the blade 3 relative to the hub 4. In this initial rotation state 19, a length L1 of the first arc portion 14 and a length L2 of the second arc portion 15 are equal to each other.

FIG. 6 shows the metal arc 13 of FIG. 5 in a first rotation state 20 in which the blade 3 was rotated relative to the hub 3 by a pitch angle α. When the blade 3 rotates relative to the hub 4, a force F1 is applied to the first arc portion 14' and a force F2 is applied to the second arc portion 15', as shown in FIG. 6. Thereby, the force F1 is applied by the inner ring 10, i. e. by the extending portion 17 (FIG. 3), to the first arc portion 14'. Further, the force F2 is applied by the outer ring 11, i.e. by the extending portion 18 (FIG. 3), to the second arc portion 15'. Due to the forces F1, F2, the first arc portion 14' is shifted relative to the second arc portion 15'. As a consequence, a length L1' of the first arc portion 14' is reduced. Further, a length L2' of the second arc portion 15' is increased by the same amount as the length L1' was reduced. In other words, the bent portion 16 has travelled due to the rotation of the blade 3 along the metal arc 13. As a consequence, a portion of the first arc portion 14 in the initial rotation state 19 (FIG. 5) has become the bent portion 16' in the first rotation state 20 (FIG. 6). Further, the bent portion 16 in the initial rotation state 19 (FIG. 5) has become a portion of the second arc portion 15' in the first rotation state 20 (FIG. 6).

FIG. 7 shows the metal arc 13 of FIG. 5 in a second rotation state 21 of the blade 3 relative to the hub 4. Here, a force F1' is applied to the first arc portion 14" and a force F2' is applied to the second arc portion 15". Due to the forces F1', F2', the first arc portion 14" is shifted relative to the second arc portion 15". As a consequence, a length L1" of the first arc portion 14" is increased. Further, a length L2" of the second arc portion 15" is reduced.

Figure 8:
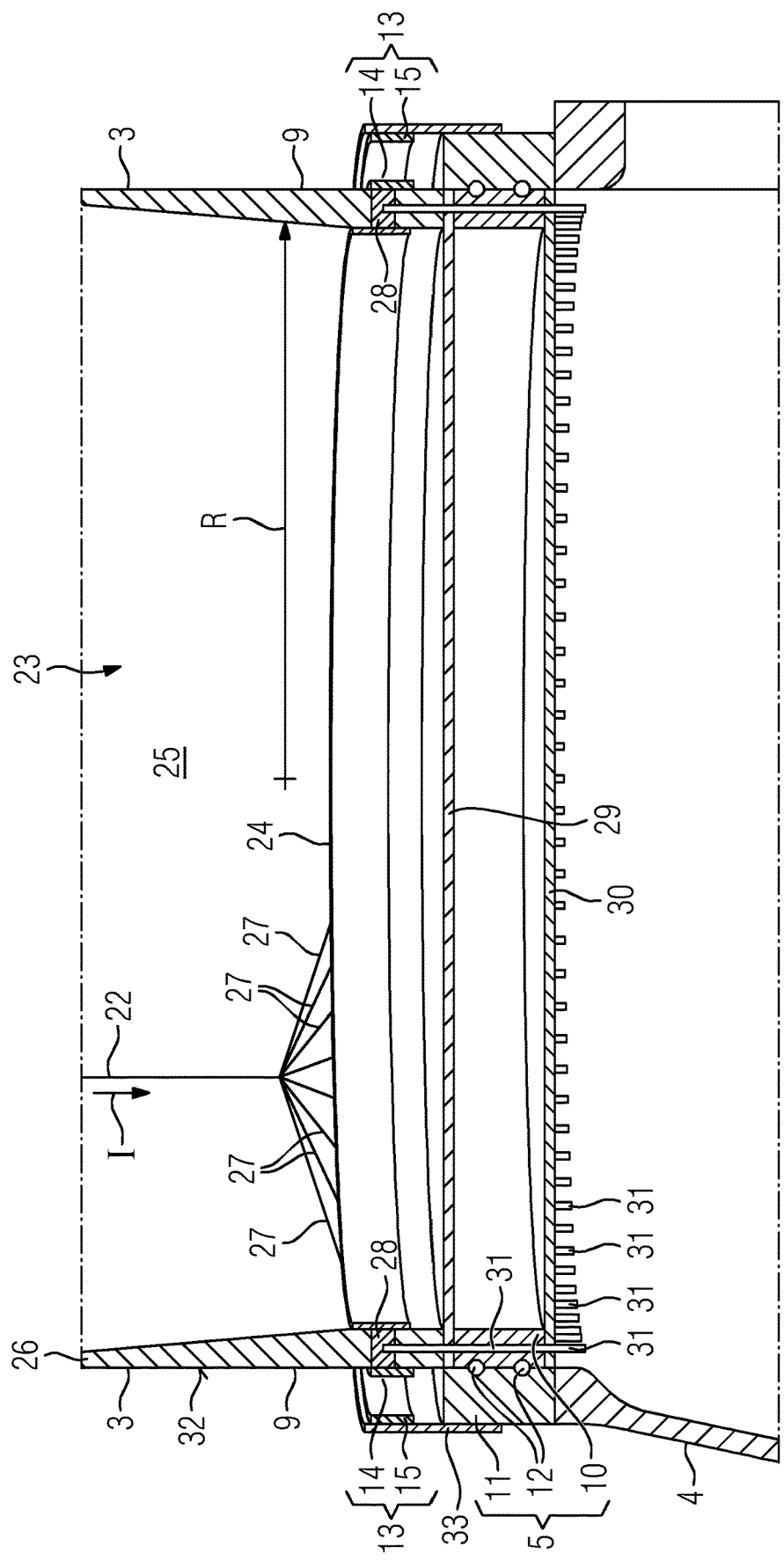
FIG. 8 shows a partial cross-section and partial perspective view of a portion of the hub and of the blade along with a pitch bearing and metal arcs of the rotor of FIG. 2 according to a first embodiment.

FIG. 8 shows a partial cross-section and partial perspective view of a portion of the hub 4 and of the blade 3 along with a pitch bearing 5 and metal arcs 13 of the rotor 2 of FIG. 2 according to a first embodiment. As in FIG. 3, which showed the principle of the metal arcs 13, in the first embodiment shown in FIG. 8, the metal arcs 13 are configured such that the first arc portion 14 and the second arc portion 15 are parallel to each other in a radial direction R of the blade 3. Further, the metal arcs 13 are arranged outboard with respect to the pitch bearing 5.

When a lightning strikes the blade 3, the lightning current I is transmitted via a down conductor 22 to the root section 9 of the blade 3. The root section 9 comprises in the cavity 23 in its hollow interior a metal ring 24. The metal ring 24 is attached to an inner wall 25 of a shell 26 of the blade 3. The down conductor 22 is split in the root section 9 into several branches 27 (some of them are illustrated in FIG. 8) and connected to the metal ring 24 at various positions thereof. Thus, the lightning current I is transmitted to the metal ring 24.

The metal ring 24 is electrically connected to conductive bushings 28 of the blade 3. The bushings 28 are configured for mounting the blade root section 9 to an inner reinforcement plate 29, the inner ring 10 of the pitch bearing 5, and an outer reinforcement plate 30 by means of bolts 31. The bushings 28 are, for example, threaded bushings. In FIG. 8, exemplarily some of the bolts 31 are denoted with a reference sign. Thus, the lightning current I is transmitted from the metal ring 24 to the bushings 28.

The first arc portion 14 of each metal arc 13 is mechanically connected at its end portion 39 (FIG. 4) to the outer surface 32 of the blade root section 9 such that they are in electrical connection with the bushings 28. Thus, the lightning current I is transmitted from the bushings to the first arc portion 14 of each of the several metal arcs 13. From the first arc portion 14, the lightning current I is transmitted via the bent portion 16 to the second arc portion 15. The second arc portion 15 of each of the several metal arcs 13 is mechanically connected to a protruding conductive portion 33. The protruding conductive portion 33 is fixed to the outer ring 11 of the pitch bearing 5. Thus, the lightning current I is transmitted from the second arc portion 15 of the several metal arcs 13 via the protruding portion 33 to the outer ring 11. From there on, the lightning current I is further transmitted via the nacelle 6 to the tower 7 and the foundation 8 to the ground.

While the bushings 28 and the bolts 31 would also provide a conductive path for the lightning current I, the path via the metal arcs 13 is a low impedance path. Thus, the lightning current I is predominantly bypassed the pitch bearing 5 by using the metal arcs 13.

Figure 9:
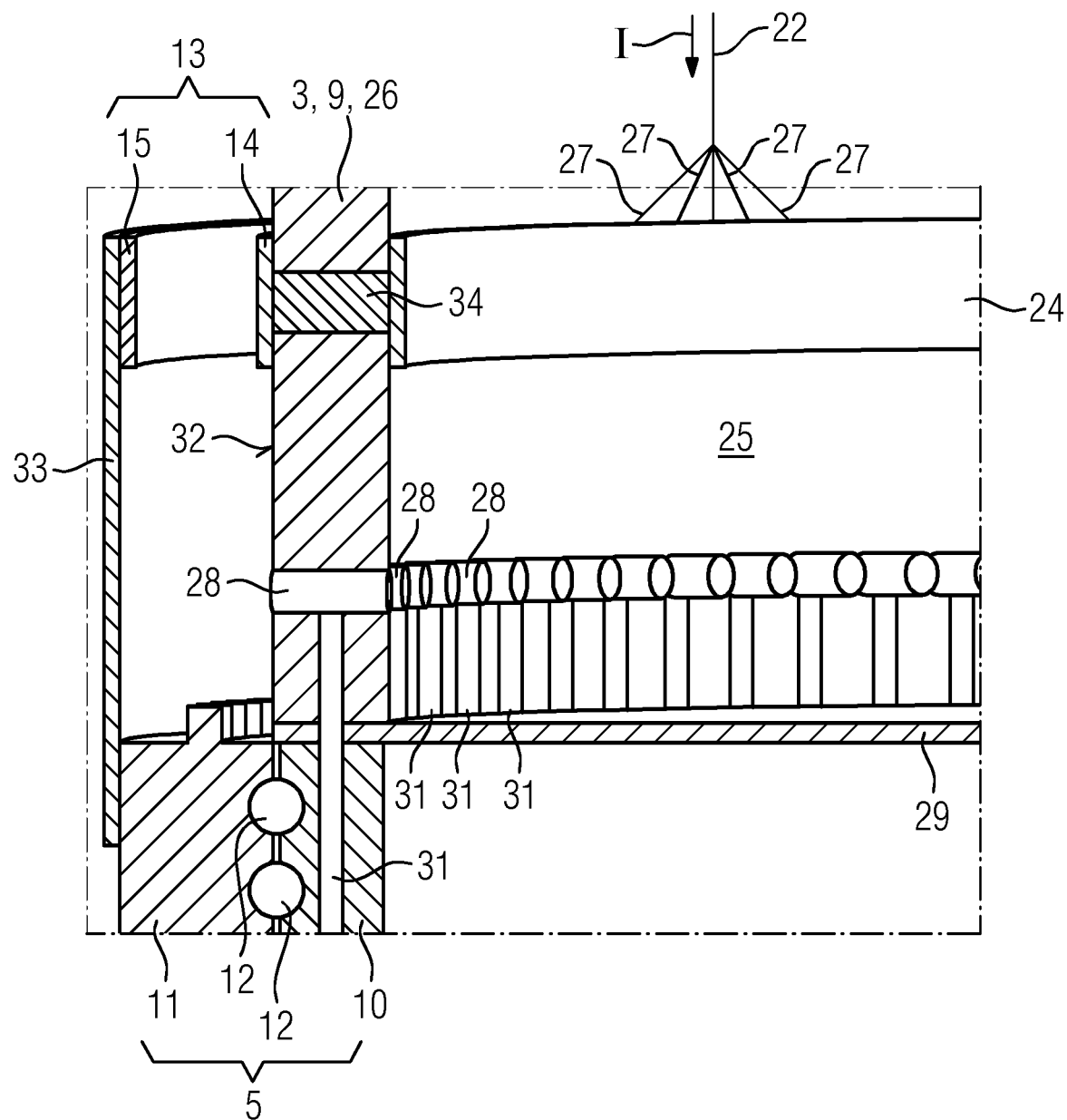
FIG. 9 shows a first variant of the first embodiment of FIG. 8.

FIG. 9 shows a first variant of the first embodiment of FIG. 8. In FIG. 9, additional conductive elements 34 are provided which extend from the interior wall 25 of the blade 3 through the shell 26 to the outer surface 32. The conductive elements 34 are arranged above the bushings 28, i. e. outboard of the bushings 28. The conductive elements 34 are electrically isolated from the bushings 28 and the bolts 31. The first arc portion 14 of the metal arcs 13 are mechanically connected to the outer surface 32 of the blade root section 9 such that they are in electrical connection with the conductive elements 34.

When a lightning strikes the blade 3, the lightning current I is transmitted by the down conductor 22, the branches 27, the metal ring 24 and the conductive elements 34 to the metal arcs 13. From the metal arcs 13, the lightning current I is transmitted to the protruding portion 33 to the outer ring 11 of the pitch bearing 5. As the conductive elements 34 are electrically isolated from the bushings 28, no lightning current is transmitted to the inner ring 10. Therefore, lightning current entering the pitch bearing can be even better prevented.

Figure 10:
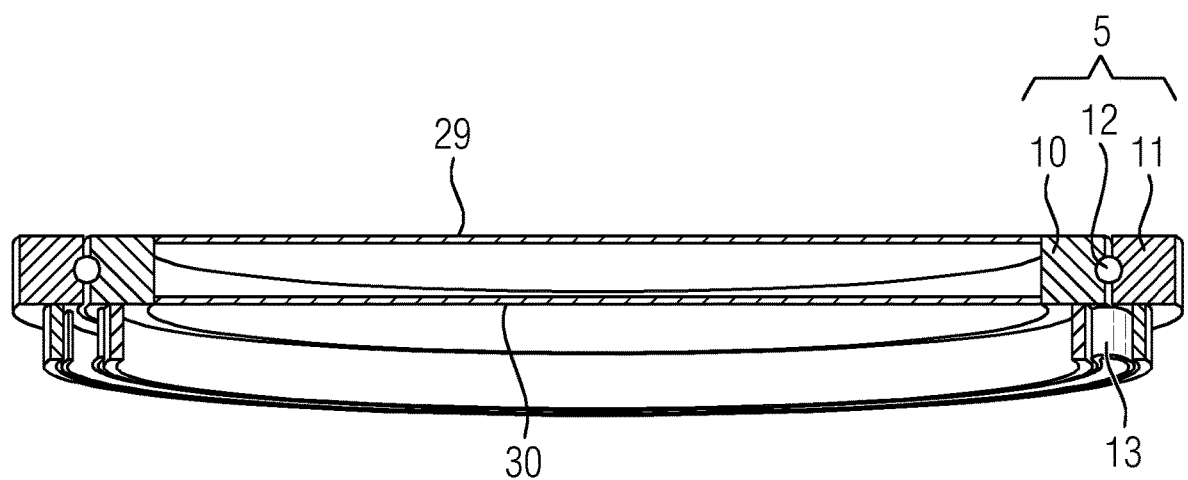
FIG. 10 illustrates a second variant of the first embodiment of FIG. 8.

In FIGS. 8 and 9, the metal arcs 13 are arranged outboard of the pitch bearing. However, the metal arcs can also be arranged inboard of the pitch bearing as shown schematically in FIG. 10.

Figure 11:
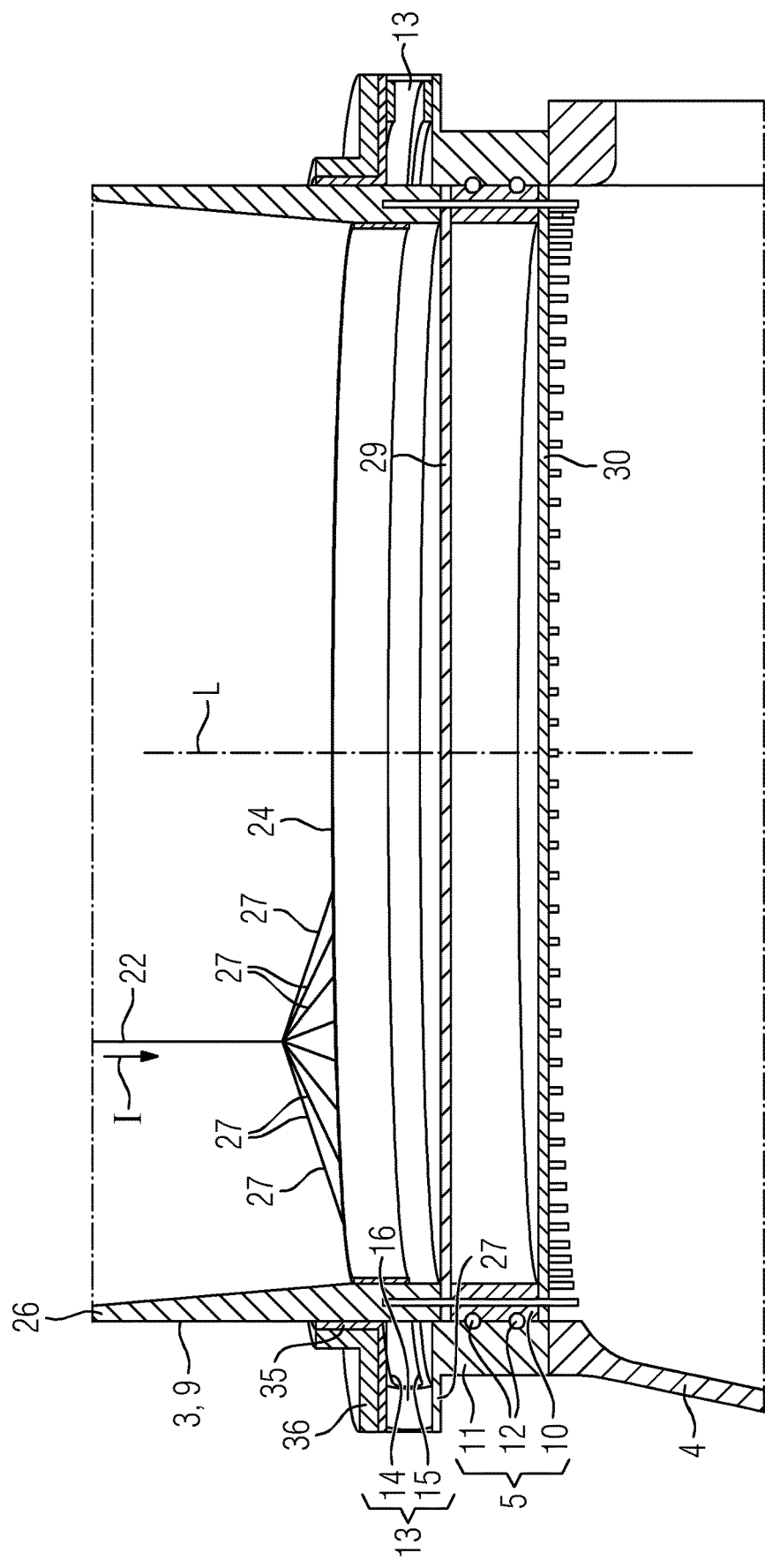
FIG. 11 shows a partial cross-section and partial perspective view of a portion of the hub and of the blade along with a pitch bearing and metal arcs of the rotor of FIG. 2 according to a second embodiment.

FIG. 11 shows a second embodiment of the rotor 2 of the wind turbine 1 of FIGS. 1 and 2. In this embodiment, the metal arcs 13 are configured such that the first and second arc portions 14 and 15 are arranged parallel to each other in a longitudinal direction L of the blade 3. In the following, only differences with respect to the embodiment of FIG. 8 are described.

In order to electrically and mechanically connect the metal ring 24 with the metal arcs 13, a conductive circumferential angled protruding portion 35 and an angled bracket 36 are provided. The conductive circumferential angled protruding portion 35 and the angled bracket 36 are attached to the root section 9 of the blade 3. Further, a metallic plate 37 is attached to the hub, e.g., to the outer ring 11 of the pitch bearing 5. A lightning current I striking the blade 3 is transmitted via the down conductor 22, the metal ring 29, and the circumferential angled protruding portion 35 to the metal arcs 13. From the metal arcs 13, the lighting current I is transmitted to the metal plate 37 to the hub 4.

Although not shown in detail in FIG. 11, the electrical path from the metal ring 29 to the conductive protruding portion 25 in the second embodiment can be configured via the bushings 28 (FIG. 8) or via additional conductive elements 34 (FIG. 9).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A rotor for a wind turbine, comprising:
   a blade;
   a hub;
   a pitch bearing being configured to support the blade rotatably about a longitudinal axis of the blade and relative to the hub; and
   one or more metal arcs for conducting a lightning current from the blade to the hub;
   wherein each of the one or more metal arcs comprises:
      a first arc portion electrically and mechanically connected to the blade,
      a second arc portion electrically and mechanically connected to the hub, and
      a bent portion connecting the first arc portion and the second arc portion;
   wherein each of the one or more metal arcs is configured such that, when the blade rotates relative to the hub, the first arc portion is shifted relative to the second arc portion and a length of the first arc portion is reduced or increased at an expense of an increase or decrease of a length of the second arc portion;
   wherein the second arc portion of each of the one or more metal arcs is electrically and mechanically connected to an outer ring of the pitch bearing and the outer ring of the pitch bearing is electrically and mechanically connected to the hub.

2. The rotor according to claim 1, wherein each of the one or more metal arcs is configured such that in an initial rotation state of the blade relative to the hub, the length of the first arc portion is equal to the length of the second arc portion, and in a rotation state of the blade relative to the hub offset from the initial rotation state, the length of the first arc portion is different from the length of the second arc portion.

3. The rotor according to claim 1, wherein:
   the first arc portion of each of the one or more metal arcs comprises:
      a main portion connected to the bent portion, the bent portion and the main portion being freely movable with respect to the blade, and
      an end portion connected to the main portion, the end portion being fixedly connected to the blade, and both the main portion and the end portion being electrically connected to the blade; and
   the second arc portion of each of the one or more metal arcs comprises:
      a main portion connected to the bent portion, the bent portion and the main portion being freely movable with respect to the hub, and
      an end portion connected to the main portion, the end portion being fixedly connected to the hub, and both the main portion and the end portion being electrically connected to the hub.

4. The rotor according to claim 1, wherein the blade comprises a blade root section and the first arc portion of each of the one or more metal arcs is electrically and mechanically connected to the blade root section.

5. The rotor according to claim 1, wherein the one or more metal arcs are arranged along an outer circumference of the blade.

6. The rotor according to claim 1, wherein the blade comprises, in a hollow interior of the blade, an interior conductive ring for connection with one or more down conductors of the blade, the interior conductive ring being electrically connected with the first arc portion of each of the one or more metal arcs.

7. The rotor according to claim 6, wherein the interior conductive ring of the blade is electrically connected with the first arc portion of each of the one or more metal arcs of conductive elements extending from the blade interior to the blade exterior.

8. The rotor according to claim 7, wherein the pitch bearing comprises an inner ring mounted to the blade and an outer ring mounted to the hub, and the conductive elements of the blade are conductive bushings configured for mounting the blade to the inner ring of the pitch bearing by fasteners.

9. The rotor according to claim 7, wherein the pitch bearing comprises an inner ring mounted to the blade and an outer ring mounted to the hub, and the conductive elements of the blade are arranged spaced apart and electrically isolated from conductive bushings of the blade being configured for mounting the blade to the inner ring of the pitch bearing of fasteners.

10. The rotor according to claim 1, wherein the hub comprises an outer circumferential protruding portion protruding in a direction of the blade, and the second arc portion of each of the one or more metal arcs is electrically and mechanically connected to the outer circumferential protruding portion of the hub.

11. The rotor according to claim 1, wherein the one or more metal arcs are arranged outboard with respect to the pitch bearing.

12. The rotor according to claim 1, wherein the first arc portion and the second arc portion of each of the one or more metal arcs are arranged parallel to each other in a radial direction of the blade.

13. The rotor according to claim 1, wherein the first arc portion and the second arc portion of each of the one or more metal arcs are arranged parallel to each other in a longitudinal direction of the blade.

14. A wind turbine comprising the rotor according to claim 1.

* * * * *